US007969447B2

(12) United States Patent
Scheepers et al.

(10) Patent No.: US 7,969,447 B2
(45) Date of Patent: Jun. 28, 2011

(54) DYNAMIC WRINKLE MAPPING

(75) Inventors: Ferdi Scheepers, Pleasant Hill, CA (US); John Anderson, San Anselmo, CA (US); Rick Sayre, Kensington, CA (US)

(73) Assignee: Pixar, Emeryville, CA (US)

( * ) Notice: Subject to any disclaimer, the term of this patent is extended or adjusted under 35 U.S.C. 154(b) by 687 days.

(21) Appl. No.: 10/841,219

(22) Filed: May 6, 2004

(65) Prior Publication Data
US 2005/0248582 A1 Nov. 10, 2005

(51) Int. Cl.
G09G 5/00 (2006.01)
G06T 13/00 (2011.01)
G06T 15/00 (2011.01)

(52) U.S. Cl. .................... 345/582; 345/473; 345/419

(58) Field of Classification Search .......... 345/582, 345/583, 584, 473, 474, 475
See application file for complete search history.

(56) References Cited

U.S. PATENT DOCUMENTS

| | | | | |
|---|---|---|---|---|
| 5,854,634 | A * | 12/1998 | Kroitor | 345/473 |
| 6,300,960 | B1 * | 10/2001 | DeRose et al. | 345/474 |
| 6,307,949 | B1 | 10/2001 | Rhoads | |
| 6,373,492 | B1 * | 4/2002 | Kroitor | 345/473 |
| 6,407,743 | B1 * | 6/2002 | Jones | 345/582 |
| 6,504,546 | B1 * | 1/2003 | Cosatto et al. | 345/473 |
| 6,556,196 | B1 * | 4/2003 | Blanz et al. | 345/419 |
| 6,828,972 | B2 * | 12/2004 | Zhang et al. | 345/473 |
| 6,975,750 | B2 * | 12/2005 | Yan et al. | 382/118 |
| 6,999,084 | B2 * | 2/2006 | Mochizuki et al. | 345/473 |
| 7,006,683 | B2 * | 2/2006 | Brand | 382/154 |
| 7,212,664 | B2 * | 5/2007 | Lee et al. | 382/154 |
| 2001/0020946 | A1 * | 9/2001 | Kawakami et al. | 345/582 |
| 2002/0113799 | A1 * | 8/2002 | Brand | 345/582 |
| 2003/0179203 | A1 * | 9/2003 | Bruderlin et al. | 345/473 |
| 2005/0057569 | A1 * | 3/2005 | Berger | 345/473 |
| 2005/0147280 | A1 * | 7/2005 | Yan et al. | 382/118 |

OTHER PUBLICATIONS

Hsu et al., Facial Expression Cloning: Using Expressive Ratio Image and FAP to Texture Conversion, 2003, IEEE, pp. 694-698.*
Gong et al., An Investigation into Face Pose Distributions, 1996, IEEE, pp. 1-7.*
Bando et al., A simple method for modeling wrinkles on human skin, 2002, IEEE, pp. 1-10.*
Dellaert et al., Jacobian images of super-resolved texture maps for model-based motion estimation and tracking, 1998, IEEE, pp. 2-7.*
Bui et al., Improvements on a simple muscle-based 3D face for realistic facial expressions, 2003, IEEE, pp. 1-8.*
Kono et al., Wrinkle Generation Model for 3D Facial Expression, p. 1.*
Lewis et al., Pose Space Deformation: A Unified Approach to Shape Interpolation and Skeleton-Driven Deformation, 2000, ACM, pp. 165-172.*
Hadap et al., Animating Wrinkles on Clothes, 1999, IEEE, pp. 175-183.*

(Continued)

*Primary Examiner* — M Good Johnson
(74) *Attorney, Agent, or Firm* — Kilpatrick Townsend & Stockton LLP

(57) ABSTRACT

A method for a computer system includes retrieving a plurality of base poses for an object, retrieving a plurality of base texture maps associated with the plurality of base poses, receiving a desired pose for the object, determining a plurality of coefficients associated with the plurality of base poses in response to the desired pose and to the plurality of base poses, and determining a desired texture map in response to the plurality of coefficients and to the plurality of base texture maps.

8 Claims, 7 Drawing Sheets

OTHER PUBLICATIONS

Cutler et al., An Art-Directed Wrinkle System for CG Characters, pp. 117-125.*

Zicheng, Liu, Ying Shan, Zhengyou Zhang, "Expressive Expression Mapping with Ratio Images", *Microsoft Research* (6 pages); (Z. Liu, Y. Shan, Z. Zhang, "Expressive Expression Mapping with Ratio Images," In Computer Graphics, pp. 271-276. Siggraph, Aug. 2001.).

Douglas Fidaleo, Jun-yong Noh, Taeyong Kim, Reyes Enciso, and Ulrich Neumann, "Classification and Volume Morphing for Performance-Driven Facial Animation", *University of Southern California*, 11 pages. (D. Fidaleo, Y. Y. Noh, T. Kim, R. Encisco, U. Neumann, "Classification and Volume Morphing for Performance-Driven Facial Animation," Proceedings of Digital and Computational Video, 1999.).

Zicheng Liu, Zhengyou Zhang, Chuck Jacobs, Michael Cohen, "Rapid Modeling of Animated Faces From Video", *Technical Report, MSR-TR Nov. 2000, Microsoft Research, Microsoft Corporation*, (pp. 1-21) (Feb. 28, 2000); (Z. Liu, Z. Zhang, C. Jacobs, and M. Cohen, "Rapid Modeling of Animated Faces from Video," Proceedings of Visual 2000, pp. 58-67, Sep. 2000.).

Search/Examination Report dated Mar. 4, 2009 from Australian Patent Application No. 2004319526, 2 pages.

Search/Examination Report dated Ju. 3, 2009 from Australia Patent Application No. 2004319526, 2 pages.

Kry, Paul G. et al.; "EigenSkin; Real Time Large Deformation Character Skinning in Hardware"; 2002, http://cadcam.me.ccu.edu.tw/chinese/subhp/course/data/acagd/200704194.pdf, pp. 153-159, 200.

Blanz, Volker et al.; "A Morphable Model for the Synthesis of 3D Faces"; 1999, *Computer Graphics Proceedings*, pp. 187-194.

Pighin, Frederic et al.; "Synthesizing Realistic Facial Expressions from Photographs"; 1998, *SIGGRAPH 98 Conference Proceedings*, pp. 75-84.

Zhang, Quingshan et al.; Geometry-Driven Photorealistic Facial Expression Synthesis; 2003, *Eurographics/SIGGRAPH Symposium on Computer Animation*, pp. 177-186, and 374.

Search/Examination report dated Jan. 21, 2011 from European Patent Application No. 04776163.0, 5 pages.

* cited by examiner

DYNAMIC WRINKLE MAPPING

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to computer animation. More particularly, the present invention relates to techniques and apparatus for rendering of more natural-looking wrinkles or creases on a posed object.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar. Pixar developed both computing platforms specially designed for CAA, and animation software now known as RenderMan®. RenderMan® was particularly well received in the animation industry and recognized with two Academy Awards®. RenderMan® software is used to convert graphical specifications of objects and convert them into one or more images. This technique is known generally in the industry as rendering.

Previously, some methods were proposed to graphically specify the appearance of fine wrinkles and/or fine creases on objects for the rendering process. One method was to fully-mathematically define where the fine wrinkles and creases would appear on the object and fully physically simulating the three dimensional microscale geometry of the wrinkles. Another method was to dynamically adjust surface geometry based upon underlying object models, for example, skin on muscle models.

Drawbacks to these approaches for specifying fine wrinkles and creases included that the mathematical definition of such fine features for an object would require a large number of detailed surfaces that would be difficult to represent. Another drawback included that the simulation of the microscale geometry or performing a surface mapping based upon a underlying model would be computationally prohibitive. Yet another drawback was that if rendered, the specified features may not appear natural in the full and often extreme range of poses of the three-dimensional object.

Another method that was used to specify wrinkles included mapping of a two-dimensional image (texture maps) onto a three-dimensional object surface. Using these techniques, the wrinkles/creases are represented by a two-dimensional map, where the intensity of pixels in the map specify "peaks" and "valleys" of the surface. Another method, although not necessarily in the prior art, decomposed the texture map into directional-based texture maps. Next, at render time, the pose of the object is also decomposed into directional-based poses. Finally, the texture map is formed by combining the directional-based texture-maps and the directional-based poses.

Drawbacks to this approach for rendering wrinkles included that only one texture map would be used to specify wrinkles for all poses of the three-dimensional object. Similar to the technique described above, wrinkles that may appear natural in one character pose, may be inappropriate and unnatural looking in another character pose. For example, directional components often fade visually on and off in unnatural ways. Additional drawbacks include that the results are unintuitive and that the user cannot control the appearance and disappearance of wrinkles in arbitrary poses.

In light of the above, what is needed are improved techniques for users to specify wrinkles and creases for objects without the drawbacks described above.

BRIEF SUMMARY OF THE INVENTION

The present invention relates to computer animation. More particularly, the present invention relates to novel methods and apparatus for dynamically specifying natural-looking fine wrinkles and/or fine creases on an object in arbitrary poses.

In various embodiments, a user typically inputs a series of poses for an object and a series of texture maps, specifying wrinkles, and the like, associated with each pose. Next, based upon the poses and texture maps, common pose elements and common elements from the texture map are identified and stored as a series of base poses and associated base texture maps. Later, during render time, a desired pose for the object is received and mapped to a weighted combination of the base poses. Next, a weighted combination of the base texture maps is formed as the texture map for the object in the desired pose. The object is then rendered using the formed texture map in the desired pose.

In various embodiment, the process for specifying wrinkles for an object may be an iterative process. For example, after viewing the rendered results, the user may decide to modify the wrinkle behavior of the object in a pose. To do this, the user "trains" or creates a new texture map for the object in the new pose. Next, the above process is repeated to define a new series of base poses and associated base texture maps. Subsequently, when the object is in the new pose, the texture map is substantially similar to the new texture map.

According to one aspect of the invention, a method for a computer system is disclosed. One technique includes retrieving a plurality of base poses for an object, and retrieving a plurality of base texture maps associated with the plurality of base poses. Processes may include receiving a desired pose for the object, determining a plurality of coefficients associated with the plurality of base poses in response to the desired pose and to the plurality of base poses, and determining a desired texture map in response to the plurality of coefficients and to the plurality of base texture maps.

According to another aspect of the invention, a computer program product for a computer system including a processor is described. The computer code may include code that directs the processor to determine a plurality of base poses for an object, code that directs the processor to determine a plurality of base texture maps associated with the plurality of base poses, and code that directs the processor to determine the desired pose for the object. The code may also include code that directs the processor to determine a weighted combination of the plurality of base poses for the object to represent the desired pose for the object, wherein the weighted combination comprises a plurality of coefficients, and code that directs the processor to form a desired texture map by forming a weighted combination of the plurality of base texture maps in response to the plurality of coefficients and the plurality of base texture maps. The codes typically reside on a tangible media such as a magnetic media, optical media, semiconductor media, and the like.

According to yet aspect of the invention, a rendering apparatus is discussed. The apparatus may include a memory configured to store a first plurality of component poses for a three-dimensional object, wherein the memory is also configured to store a first plurality of component two-dimensional images associated with the first plurality of component poses. The system may also include a processor coupled to the memory, wherein the processor is configured to receive a specification of a desired pose for the three-dimensional object, wherein the processor is configured to determine a weighted combination of a second plurality of component poses from the first plurality of component poses to approximately form the desired pose, wherein the processor is configured to form a desired two-dimensional image from a weighted combination of a second plurality of two-dimensional images from the first plurality of two-dimensional images, wherein the second plurality of two-dimensional images are associated with the second plurality of component poses.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
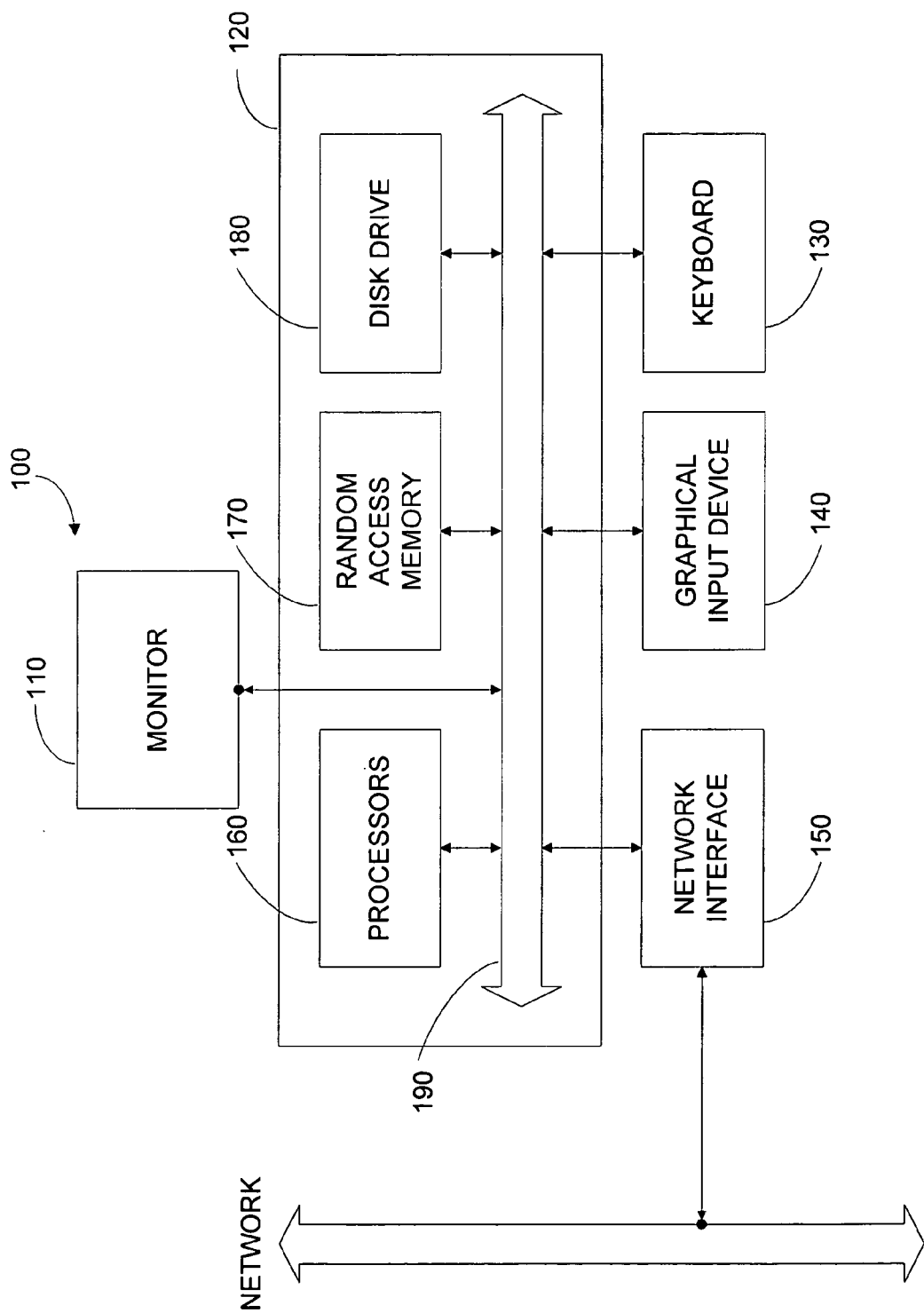
FIG. 1 illustrates a block diagram of a rendering system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, embodiments of the herein described invention including scene descriptors, object data files, shader descriptors, a rendering engine, output image files, texture maps, displacement maps, object pose data files, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2A:
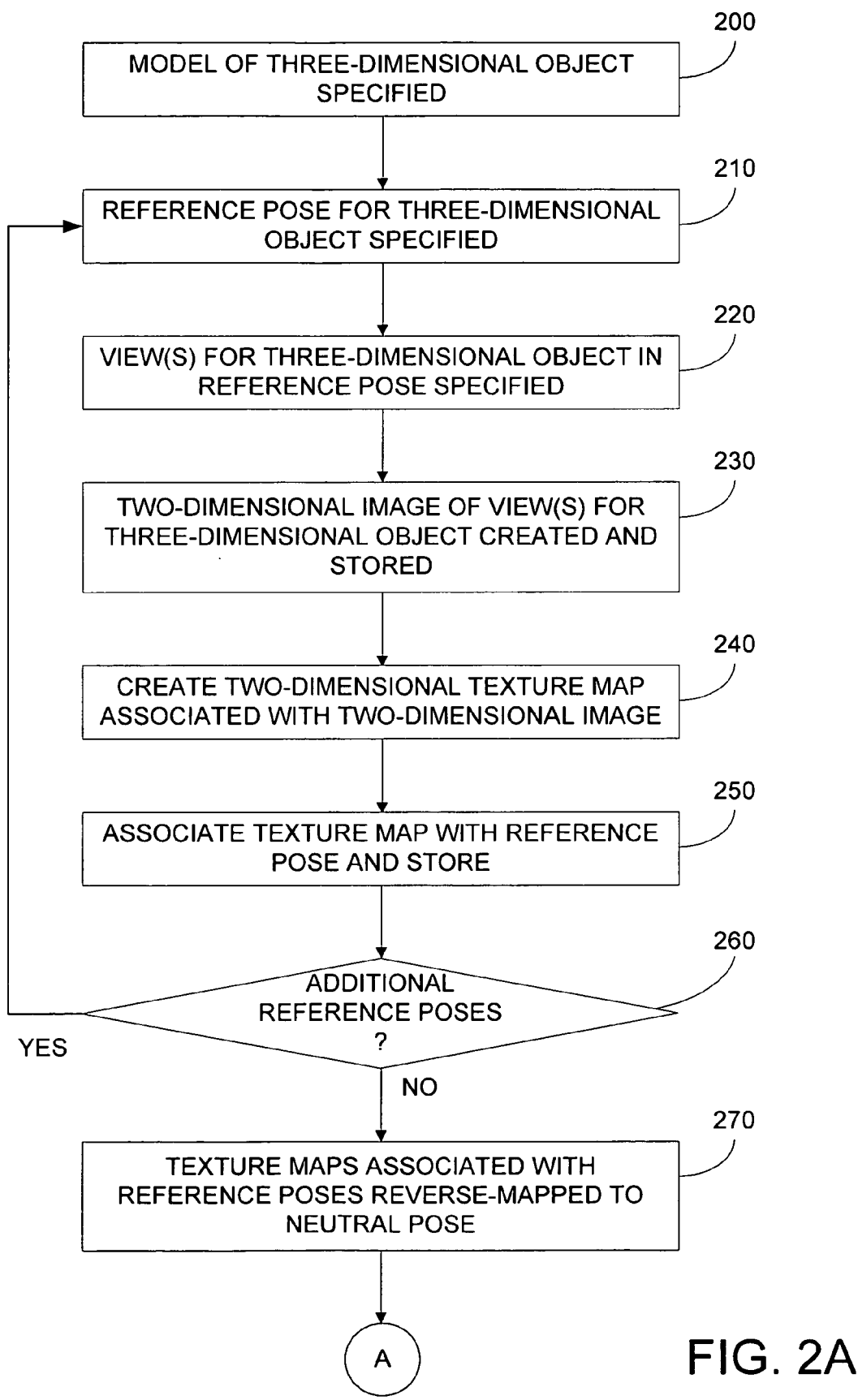
FIGS. 2A-B illustrate a block diagram of a process according to an embodiment of the present invention.
Figure 2B:
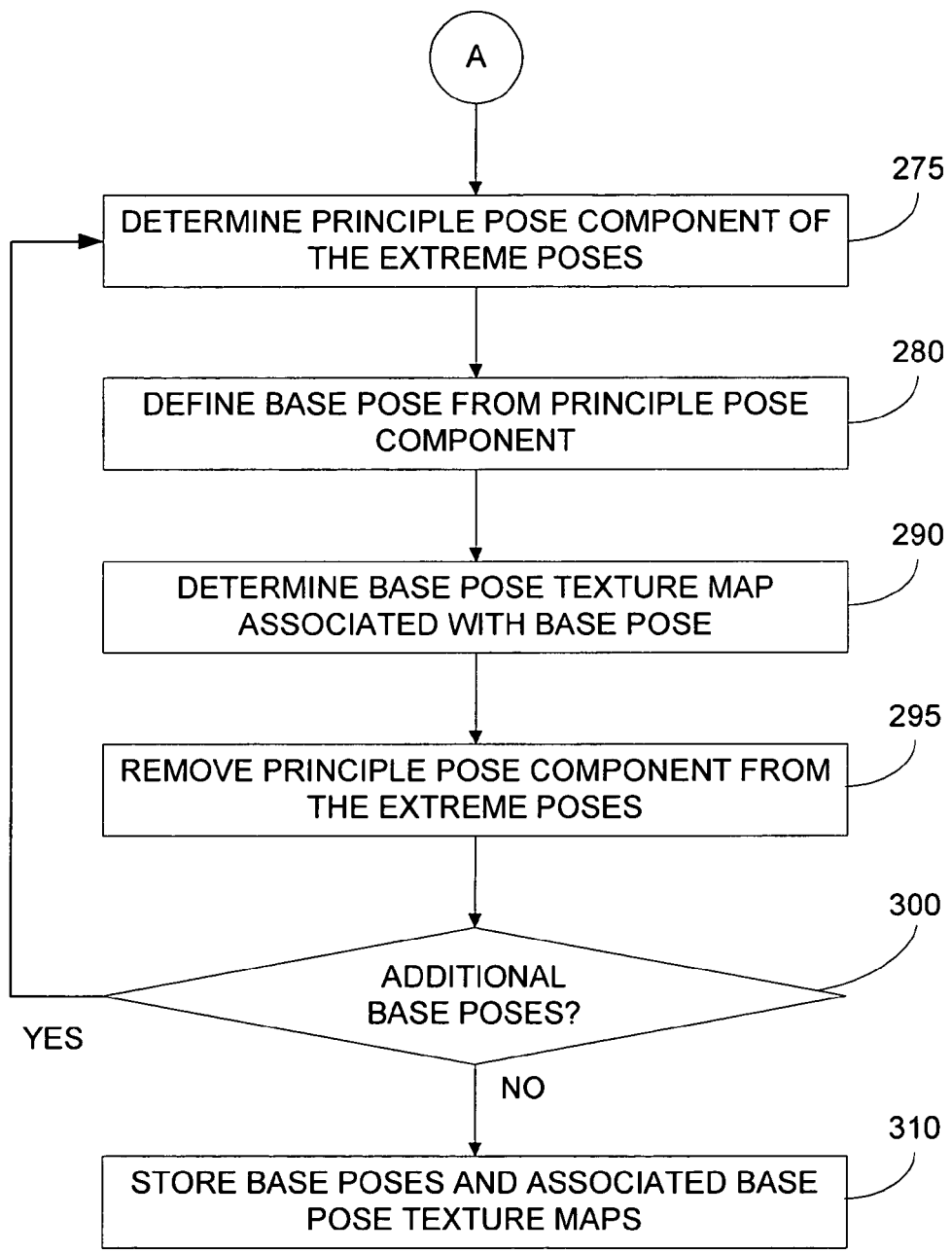

FIGS. 2A-B illustrate a block diagram of a process according to an embodiment of the present invention.

More specifically, FIGS. 2A-B illustrate a process of defining and processing of texture maps.

Initially, a user opens a model of a three-dimensional object in a working environment, step 200. In typical embodiments, the model of the object is defined by another user such as an object modeler in an object creation environment. The model of the object is typically a geometric description of surfaces of the object and includes a number of animation variables (avars) that are used to control or pose the object.

Next, the user then specifies a pose for the object, step 210. In embodiments of the present invention, the user specifies the pose by manually entering values for the animation variables or automatically via manipulation of keypoints associated with the animation variables. In some embodiments, the pose is considered an "extreme" pose, or a "reference" pose.

In some embodiments, based upon this pose, one or more views of the object are then specified, step 220. In various embodiments, a view may include a specification of a camera position and orientation relative to the object in space. For example, a view may include a default view such as a "front view" camera or a "top view" camera; a perspective view, an isometric view, and the like. Additionally, the view camera characteristics may be determined by the user. Next, one or more two-dimensional images of the object associated with the views are generated and stored, step 230. In the present embodiment, the two-dimensional images are images "taken" with the view camera(s) specified above.

In other embodiments of the present invention, default views of the three-dimensional object in a default or "neutral" pose are specified, accordingly, step 220 may not be performed. In various embodiments, a two-dimensional image associated with a default view of the object in a neutral pose is computed off-line, and may not be part of a rendering process pipeline.

In FIGS. 2A-B, the next step includes the user using a conventional two-dimensional paint-type program, to "paint" a texture map, step 240. In embodiments of the present invention, any conventional paint program such as Adobe Photoshop may be used for "painting" the image.

In some embodiments of the present image, the two-dimensional image formed in step 230 is opened in the paint program, and the user "paints" the image in an overlay layer. In other embodiments, a default view of the three-dimensional object in a "neutral" pose is opened in the paint program, and again the user "paints" the image in an overlay layer.

The values of the overlay image may represent any number of characteristics of the surface of the object. For example, the overlay image may represent a surface base color, a texture map or displacement map (representing surface roughness, surface wrinkles, surface creases, and the like), or other type of surface effect. As merely an example of embodiments, the overlay represents wrinkle-type data, with data values from 0 to 1. Specifically, where the overlay data includes values from 0.5+ to 1, these areas indicate upward protrusions from the surface; where the overlay data includes values from 0 to 0.5−, these areas indicate indentations into the surface; and where the overlay data is 0.5, the surface is unperturbed. In other embodiments, different ways to represent protrusions and indentations with a two-dimensional overlay image from wrinkles, cracks, or the like, are contemplated.

In the present embodiment, the pose for the object, and the overlay image are associated and stored in memory, step 250.

Next, the process described above typically repeats at least once for a different pose of the three-dimensional object, step 260. In embodiments of the present invention, for a full range of facial animation poses, the inventors believe that at least seven to eight different poses and associated overlay images (texture maps) are desired. To better capture wrinkle behavior for a full range of facial poses, from eight to twelve different poses and associated overlay images are believed to be more desirable. Additionally, for a full range of facial poses, twelve to fifteen, and more different poses and associated overlay images are also desirable for embodiments of the present invention. For embodiments where only a portion of facial animation poses are to be "wrinkled" fewer poses and overlay images are required, e.g. adding wrinkles to only the eyes. When an object is symmetric, fewer poses and overlay images may be used, taking into account the symmetry, e.g. wrinkles associated with raising a right eyebrow can be used to specify wrinkles for raising a left eyebrow. In other embodiments, specifying wrinkles of non-facial animation objects may also require fewer poses and overlay images (texture maps). For example, to specify wrinkles of elbows, as few as two or three poses and overlay images can be used.

As the result of the above process, a number of "extreme" poses and associated texture maps are specified. Next, in some embodiments, the specified texture maps are reversed-mapped to the object in a "neutral" pose, step 270. In various embodiments, this may be done by projecting the two-dimensional texture maps back upon the respective associated "extreme" poses; "un-posing" the object from the "extreme" pose back to the "neutral" pose; and then creating one or more two-dimensional views of the object in the neutral pose. In another embodiment, the reverse-map may be performed in two-dimensions by mapping a series of key points in the overlay image to key points in a similar view of the object in the neutral pose. In other embodiments of the present invention, step 270 is not required when the user paints upon a view of the object in the "neutral" pose, as was previously described.

In the present embodiments, a principal component analysis is performed on the extreme poses to determine a number of "base" poses for the object. In various implementations, this process includes first determining the most common characteristic, or principal component, of the object from the extreme poses of the object, step 275. For example, for the most common feature for a face in a number of extreme poses may be a raised eyebrow.

Next, the process includes defining a "base" pose as the three-dimensional object posed with the most common characteristic, step 280. The base pose is typically a weighted combination of the extreme poses. Continuing the example above, the first base pose would be a face with a raised eyebrow. In this embodiment, the associated base texture pose is also a weighted combination of the texture maps associated with the extreme poses, using the same weights, step 290. For example, if a base pose is a 70% weight of a first extreme pose and a 30% weight of a second extreme pose, the associated base texture map would be approximately a 70% weight of the first extreme texture map and 30% weight of the second extreme texture map.

Finally, in this embodiment, the principal component (base pose) is removed from the extreme poses, and the associated base texture map is also removed from the associated extreme pose texture maps, step 295. The process then repeats to identify the next most common characteristic of the poses, etc., step 300. In various embodiments, the number of base poses determined may be the same as the number of extreme poses, and in other embodiments, the number of base poses may be less. For example, from eight extreme poses, six base poses may be determined; from twelve extreme poses, eight base poses may be determined; from fifteen extreme poses, ten base poses may be determined; and the like.

As a result of the above process, a number of base poses, and a corresponding number of associated base texture maps that are determined are stored, step 310. In other embodiments, the principal component analysis is also described as an Eigen XY analysis. Other methods for performing the decomposition from extreme poses and texture maps into base poses and base texture maps are contemplated.

In embodiments of the present invention, the principal component analysis is performed as determined as follows:
The pose inputs are defined as:
Rest pose $\overline{P}_j$, j=0, . . . , v−1 (v≡nGeomValues) and
n Extreme poses $\overline{P}_{ij}$, i=0, . . . , n−1 (n≡nSamples).
The corresponding wrinkle maps inputs are defined as:
Rest map $\overline{W}_l$, l=0, . . . , d−1 (d≡nDispValues) and
n Extreme maps $\overline{W}_{il}$.
Accordingly the following inputs are determined:
n Delta poses $P_{ij} = \overline{P}_{ij} - \overline{P}_j$
n Delta maps $W_{il} = \overline{W}_{il} - \overline{W}_l$
Next, solve for $C_i^k$ and $F_j^k$ for k=0, . . . , m−1, m<n, such that $$P_{ij} \approx \sum_k C_i^k F_j^k,$$

then $$F_j^k = \sum_i P_{ij} C_i^k.$$

where C: curves/time; F: shapes/space.
Similarly, since poses motivate wrinkles, $$W_{il} \approx \sum_k C_i^k D_l^k,$$

therefore solve $$D_l^k = \sum_i W_{il} C_i^k,$$

where $D_l^k$ represent wrinkle displacement variations.

In the present embodiment, the above process may be performed "on-line" or "off-line." That is, the above process may be performed in the actual rendering process pipeline or separately, i.e. before the rendering process pipeline. In various embodiments, the process below may be integrated into the rendering process pipeline.

Figure 3:
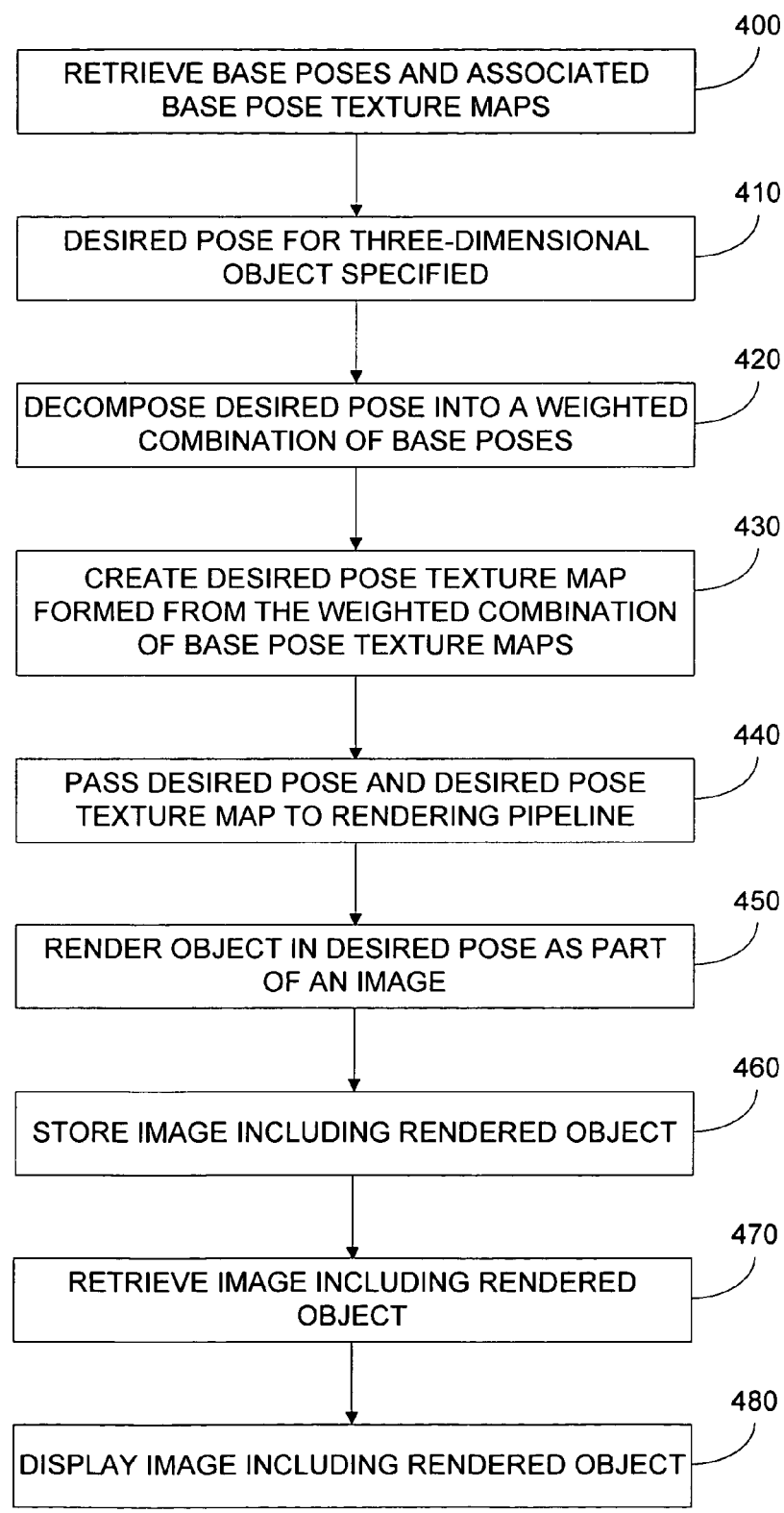
FIG. 3 illustrates a block diagram of a process according to an embodiment of the present invention.

FIG. 3 illustrates a block diagram of a process according to an embodiment of the present invention. More specifically, FIG. 3 illustrates a process of dynamically determining how wrinkles, creases, or the like, are to be rendered.

Initially, typically within a rendering process pipeline, the base poses for a three-dimensional object and base texture maps determined above are retrieved into memory, step 400. Next, the desired pose for the three-dimensional object is also retrieved into memory, step 410. In the present embodiment, the desired pose may be unique for every frame to be rendered.

In embodiments of the present invention, the desired pose is decomposed into the base poses, and a weighting for the base poses is determined, step 420. More specifically, a weighted combination of the base poses is determined in this step that approximately reproduce the desired pose. In various embodiments, the base poses are "orthogonal" from each other, thus the weighted combination is relatively unique for each desired pose.

Mathematically, the following is performed in various embodiments to determine the weights:
Given new pose (desired pose) $P_j$, determine new delta pose $P_j' = P_j - \overline{P}_j$.
Next, find amplitudes (weights)

$$a^k = \sum_j P_j' \hat{F}_j^k,$$

where $$\hat{F}_j^k = \frac{F_j^k}{\sqrt{\sum_j (F_j^k)^2}}$$

such that $$P_j' \approx \sum_k a^k \hat{F}_j^k.$$

Next, in embodiments of the present invention, the weights determined for the base poses are applied to the associated base texture maps, step 430. In particular, the weighting of the base poses are typically used to form a weighted combination of the base texture maps. The weighted combination is the texture map associated with the desired pose (the desired pose texture map). In embodiments of the present invention, the weighting of the base texture maps can be a weighted average, a gray scale logical function such as an OR, NOR, AND, and the like.

Mathematically, the following is performed in various embodiments to determine the new (desired) texture map:
Determine a new delta map:

$$W_l' \approx \sum_k \frac{a^k D_l^k}{\sqrt{\sum_j (F_j^k)^2}},$$

Then, the corresponding new texture map is therefore $W_l = W_l' + \overline{W}_l$.

In embodiments of the present invention, the desired pose texture map and the desired pose is passed on to the rendering process pipeline for rendering, step 440. In various embodiments, the rendering engine used is the Pixar brand rendering engine, Renderman®. The resulting two-dimensional image (frame) formed by the rendering engine, step 450, thus includes the three-dimensional object posed in the desired pose including wrinkles, creases, or the like, specified by the desired pose texture map.

In the present embodiment, the image is stored on media such as a hard disk, optical disk, film media, printed media, or the like, step 460. Subsequently, the image may be retrieved from the media, step 470, and output to one or more users (e.g. audience, animator), step 480.

Figure 4A:
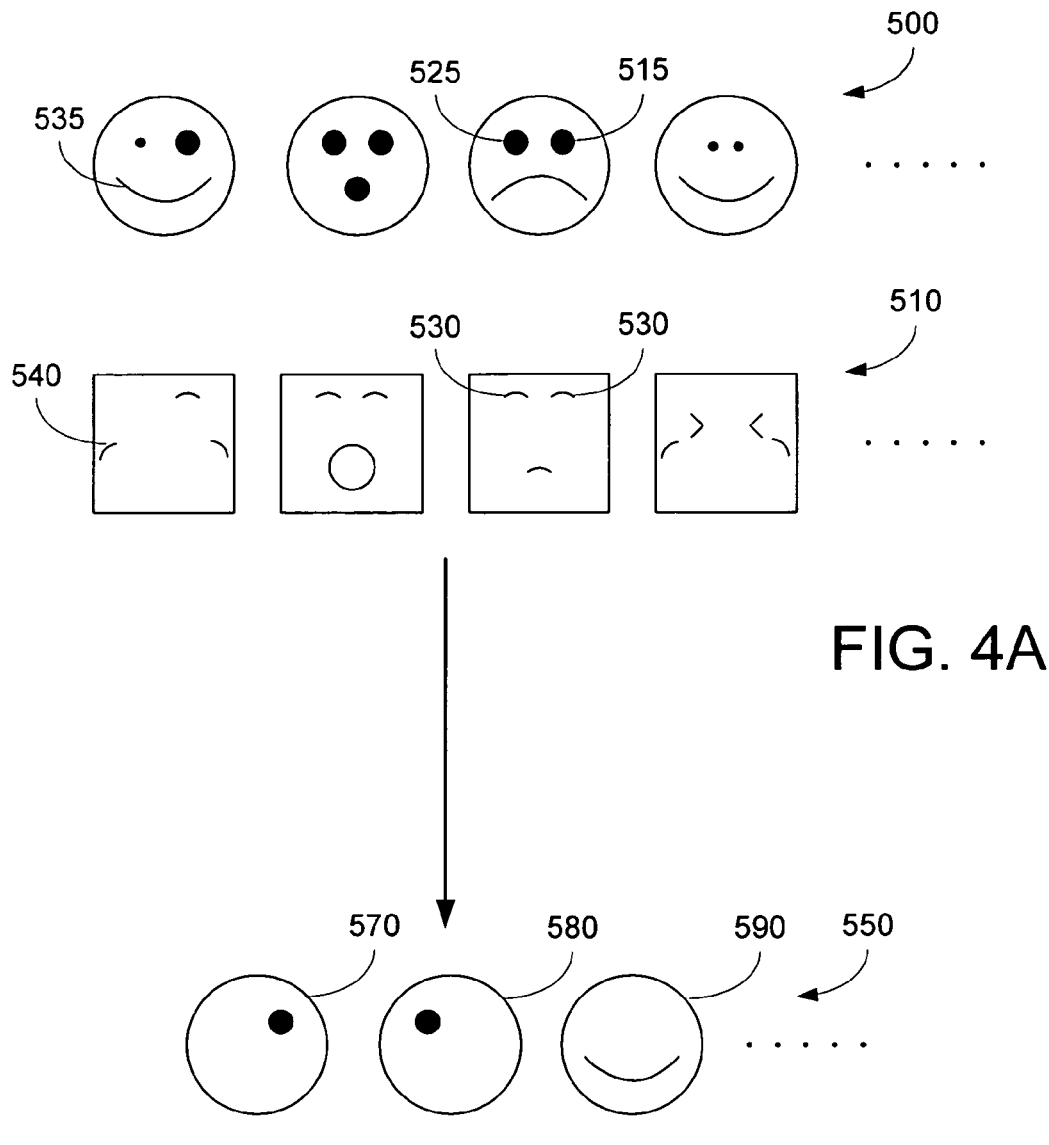
FIGS. 4A-C illustrate an example of an embodiment of the present invention.
Figure 4B:
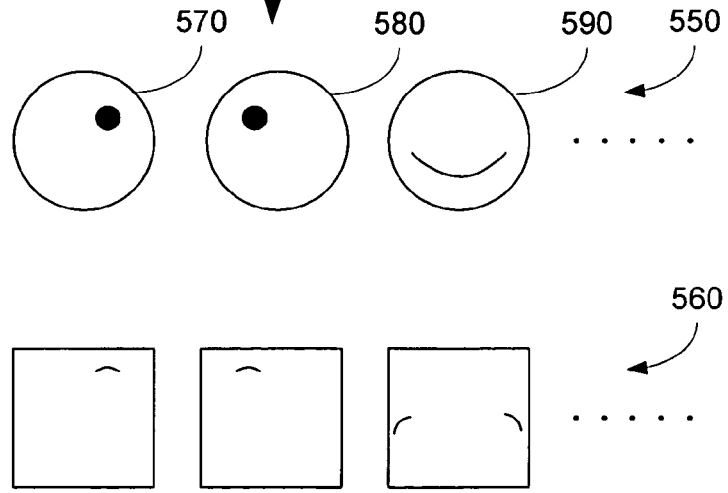
Figure 4C:
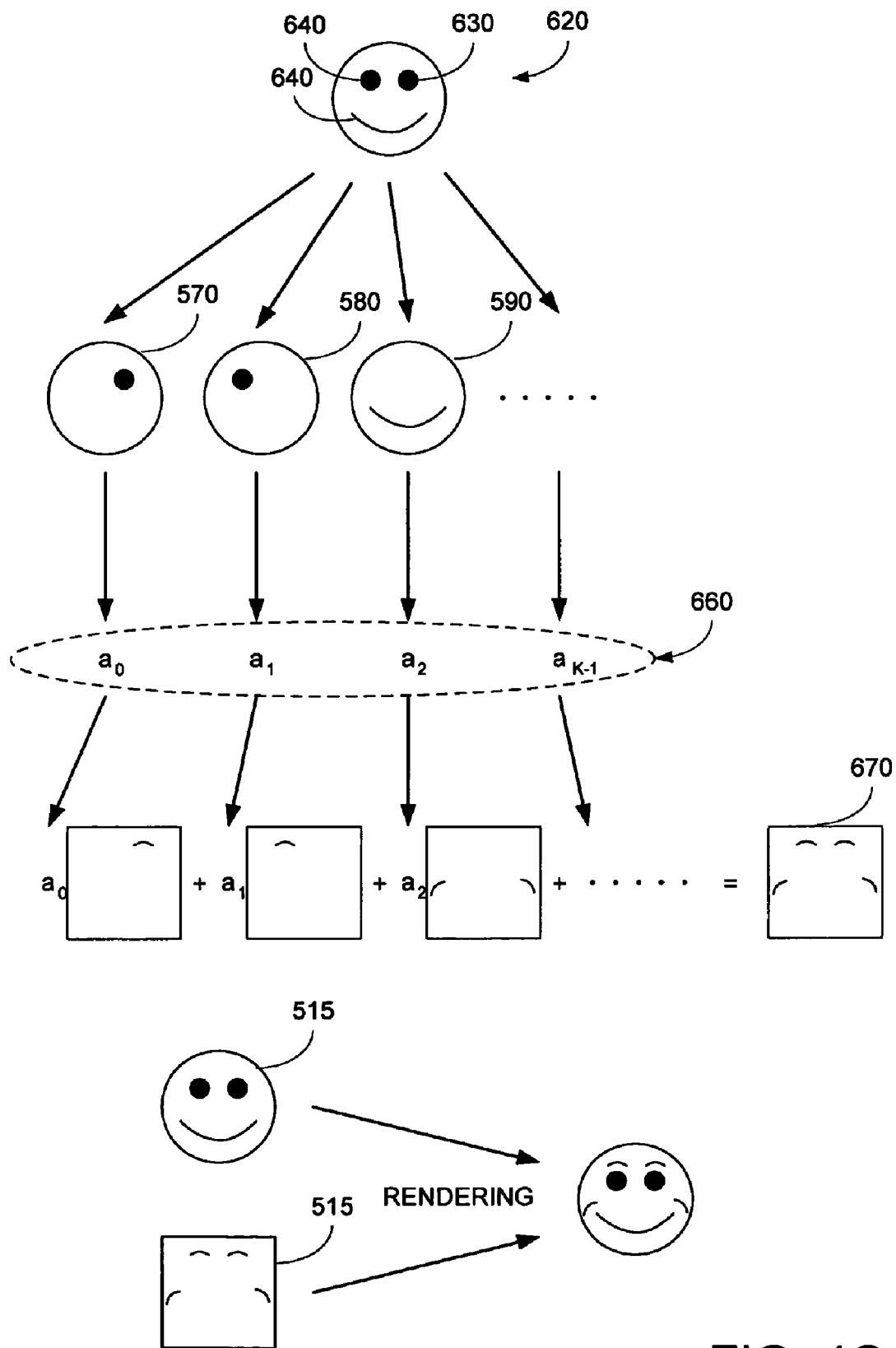

FIGS. 4A-C illustrate an example of an embodiment of the present invention. More specifically, FIGS. 4A-B illustrate an example of a principal component decomposition.

In FIG. 4A, a number of "extreme" poses 500 and a number of extreme pose texture maps 510 are illustrated. In this example, the most common components of extreme poses 500 are an enlarged right eye 515, an enlarged left eye 525, a smile 535, etc. As can be seen these components are associated with a right raised eyebrow 520, left raised eyebrow 530, then smile lines 540, etc. in extreme pose texture maps 510.

In FIG. 4B a number of base poses 550, and corresponding base pose texture maps 560 are illustrated. In this example, base poses 550 are derived from extreme poses 500, and base pose texture maps 560 are derived from extreme pose texture maps 510. As illustrated, base pose 570 is an enlarged right eye, base pose 580 is an enlarged left eye, base pose 590 is a smile, and the like. The corresponding base pose texture maps 600, 610 and 620 formed are also illustrated.

FIG. 4C illustrates the process of forming a base pose texture map from a desired pose 620. As can be seen, desired pose 620 includes raised left eye 630, raised right eye 640, and a smile 650. In this example, it is determined that desired pose 620 is formed from base poses 570, 580 and 590, accordingly, weights 660 are determined. As illustrated, weights 660 are applied to the base pose texture maps to form the desired pose texture map 670.

In the present embodiments, desired pose texture map 670 and desired pose 620 are sent along the rendering process pipeline for rendering.

Figure 5A:
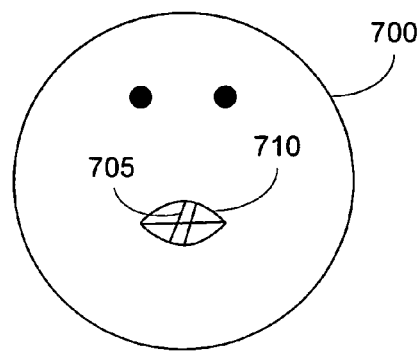
FIGS. 5A-D illustrates examples of rendered wrinkles.

FIGS. 5A-D illustrates examples of rendered wrinkles. More specifically, FIG. 5A illustrates a base pose 700 of a character face, including wrinkles 705 on a lip 710.

Figure 5B:
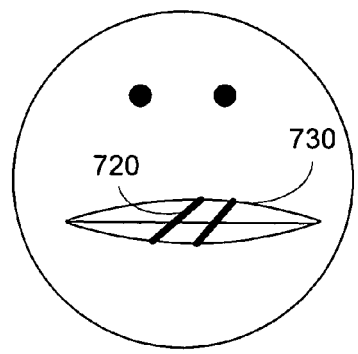
Figure 5C:
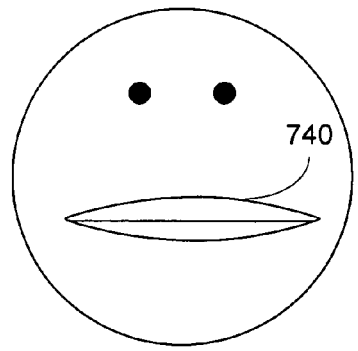

In the examples in FIGS. 5B and 5C, the character face is posed to smile, and as shown, the lip stretches accordingly. In the example in FIG. 5B, when only a single texture map for the wrinkle is used, wrinkle 720 stretches along with lip 730. As a result, the wrinkle appears to widen. Such a result is unexpected in real life, as wrinkles tend to disappear when the skin is stretched. Accordingly, previous methods did not accurately simulate fine wrinkles or lines.

As can be seen in the example in FIG. 5C, when embodiments of the present invention are used, when in the smile pose, wrinkles tend to disappear from the lip 740.

Figure 5D:
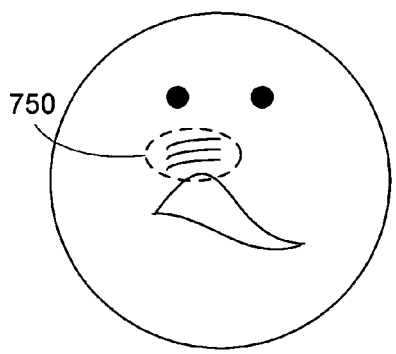

In the example in FIG. 5D, with embodiments of the present invention, when the character face is placed in other poses, wrinkles 750 may appear that were not shown in base pose 700.

What is generally disclosed in the present application are methods, apparatus, computer program products, and the like that can associate dynamic textures onto a surface, without deforming or otherwise animating geometry, through pose-based association. Many changes or modifications are readily envisioned. In light of the above disclosure, one of ordinary skill in the art would recognize that the above embodiments are useful for specifying and rendering microscale three-dimensional geometry such as cracked, wrinkled, rusty, patterned, embossed, or the like materials such as skin, cloth, paint, scales, hide, and the like. As an example, the above embodiments may be applied to the seam of clothes. In one pose of the cloth, there is no binding or wrinkling at the seam, however in other poses of the cloth, wrinkles should appear adjacent to the seam, as the material stretches around the seam, but wrinkles may not appear on the seam.

In embodiments of the present invention, the generation of texture maps for wrinkles and creases can be implemented into a rendering process pipeline, such as provided by Pixar's Renderman® product. In the prior art, users such as animator would not render fine wrinkles and creases because of the high computational requirements. Alternatively, in the prior art, animators would render fine wrinkles and creases with a single texture map, however with unnatural results, as illustrated in FIG. 5B, above. Accordingly, the inventors believe that the embodiments of the present invention now provide a usable system in which objects are rendered with fine wrinkles in a realistic manner. Accordingly, the inventors believe that frames of animation including objects having such fine wrinkles will be noticeably more realistic that was previously performed for animated features.

It should be understood that "rendering" may refer to a high quality process of converting an image from a mathematical description of a scene using a program such as RenderMan®D. Additionally, "rendering" may refer to any graphical visualization of the mathematical description of the object, or any conversion of geometry to pixels, for example "rendering" with a lower quality rendering engine, or the like. Examples of low-quality rendering engines include GL and GPU hardware and software renderers, and the like. Additionally, the rendering may be performed for any purpose, such as for visualization purposes, for film production purposes, for gaming purposes, and the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system having one or more computer processors and a computer-readable storage medium, the method comprising:
receiving a desired pose for a three-dimensional object wherein the desired pose is a geometric model comprising a desired geometric description of a first surface of the three-dimensional object;
retrieving from the computer-readable storage medium a plurality of base poses for a computer-generated model of the three-dimensional object comprising a plurality of geometric descriptions of a plurality of surfaces of the object;
retrieving from the computer-readable storage medium a plurality of base texture maps associated with the plurality of geometric descriptions of a plurality of surfaces of the three-dimensional object, wherein the base texture maps are determined in response to an operator having performed image specifying operations associated with one or more representations of the three-dimensional object;
generating with one or more of the computer processors a plurality of coefficients associated with the plurality of geometric descriptions of a plurality of surfaces of the object in response to the desired geometric description of the first surface of the three-dimensional object and to the plurality of geometric descriptions of the plurality of surfaces of the three-dimensional object;

generating with one or more of the computer processors a desired texture map in response to the plurality of coefficients and to the plurality of base texture maps;

storing the desired texture map in the computer-readable storage medium.

2. The method of claim 1 wherein:

the three-dimensional object is a character; and the base texture maps represent wrinkles on different portions of the character's face.

3. The method of claim 1 wherein:

the three-dimensional object is cloth; and the base texture maps represent wrinkles on different portions of the cloth.

4. The method of claim 1, and further comprising:

applying the desired texture map to the three-dimensional object in the desired pose to form a plurality of surface shading values;

rendering the object with one or more of the computer processors to determine pixel values in a frame of animation corresponding to the object in response to the plurality of surface shading values; and storing in the computer-readable storage medium a representation of the frame of animation.

5. A method for a computer system having one or more computer processors and a computer-readable storage medium, the method comprising:

determining a plurality of base poses comprising a plurality of geometric descriptions of a plurality of surfaces for an object;

determining a plurality of base texture maps associated with the plurality of geometric descriptions of the plurality of surfaces of the object wherein the base texture maps result from an operator having performed image specifying operations associated with one or more representations of the object;

determining a desired pose for the object, wherein the desired pose is a geometric model comprising a desired geometric description of the object;

generating with one or more of the computer processors a plurality of coefficients associated with the plurality of geometric descriptions of the plurality of surfaces of the object in response to the desired pose and the plurality of base poses for the object to represent the desired geometric description of the object;

generating with one or more of the computer processors a desired texture map in response to the plurality of coefficients and the plurality of base texture maps; and storing the desired texture map in the computer-readable storage medium.

6. The method of claim 5 further comprising:

applying the desired texture map to the object in the desired pose to form a plurality of surface shading values;

forming an image in response the plurality of surface shading values; and storing the image.

7. The method of claim 5 wherein:

the object is a character; and the base texture maps represent wrinkles on different portions of the character's face.

8. The method of claim 5 wherein:

the object is cloth; and the base texture maps represent wrinkles on different portions of the cloth.

* * * * *